United States Patent [19]

Leva

[11] Patent Number: 4,876,037
[45] Date of Patent: Oct. 24, 1989

[54] CONTACT TOWER AND METHOD OF ASSEMBLY

[76] Inventor: Max Leva, 1600 Munhall Rd., Pittsburgh, Pa. 15217

[21] Appl. No.: 267,353

[22] Filed: Nov. 4, 1988

[30] Foreign Application Priority Data

Nov. 20, 1987 [GB] United Kingdom ............... 8727234

[51] Int. Cl.$^4$ ................................. B01F 3/04
[52] U.S. Cl. .................... 261/113; 261/114.5
[58] Field of Search ............................ 261/113, 114.5

[56] References Cited

U.S. PATENT DOCUMENTS

| 2,611,596 | 9/1952 | Glitsch | 261/114.5 |
| 3,233,708 | 2/1966 | Glitsch | 261/114.5 |
| 3,928,513 | 12/1975 | Leva | 261/113 |
| 3,997,633 | 12/1976 | Leva et al. | 261/113 |
| 4,075,298 | 2/1978 | Leva et al. | 261/114.5 |
| 4,120,919 | 10/1978 | McClain | 261/114.5 |

FOREIGN PATENT DOCUMENTS 425722 6/1967 Switzerland ............... 261/114.5

OTHER PUBLICATIONS

Trans. Inst. Chem. Engineers, vol. 40, No. 2, pp. 104–113, 1962.

Primary Examiner—Tim Miles
Attorney, Agent, or Firm—William J. Ruano

[57] ABSTRACT

A gas-liquid contact tower of the kind comprising an outer tower shell, a stack of superimposed, substantially flat, horizontal trays spaced vertically apart within the shell so that in use each can carry a thin film of liquid discharged within the tower shell. The horizontal trays are provided with a plurality of flow apertures distributed substantially uniformly over at least part of the surface of the trays. The apertures are suitable to permit in use the thin liquid film on the trays to flow downwardly therethrough from tray to tray and to permit gas to flow upwardly therethrough from tray to tray. The trays are arranged as a plurality of pre-assembled sub-assemblies, each sub-assembly comprising a plurality of tray portions assembled, prior to introduction into the tower shell, to form a sub-stack of vertically spaced apart, substantially superimposed tray portions. At least some of the sub-assemblies are arranged in a side-by-side relationship in the stack. Each sub-assembly comprises a respective spacer band positioned adjacent to the margin of the superimposed tray portions to define with the adjacent tray portions a chamber which is substantially sealed apart from the apertures in the tray portions.

20 Claims, 2 Drawing Sheets

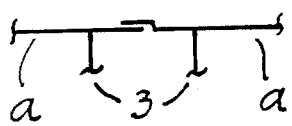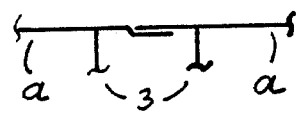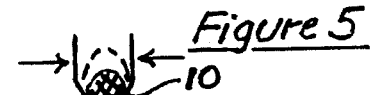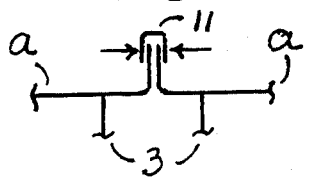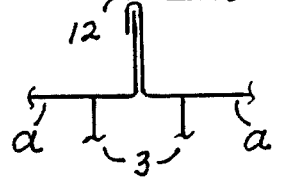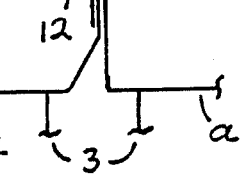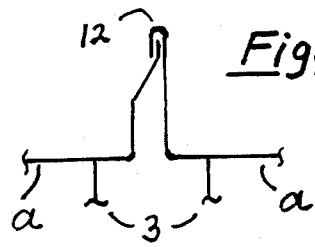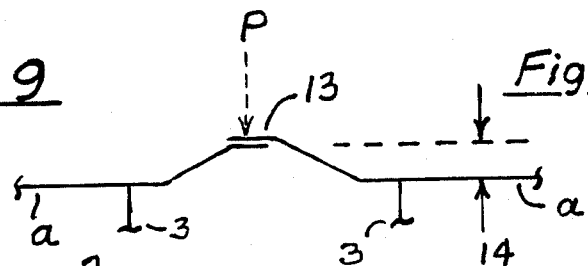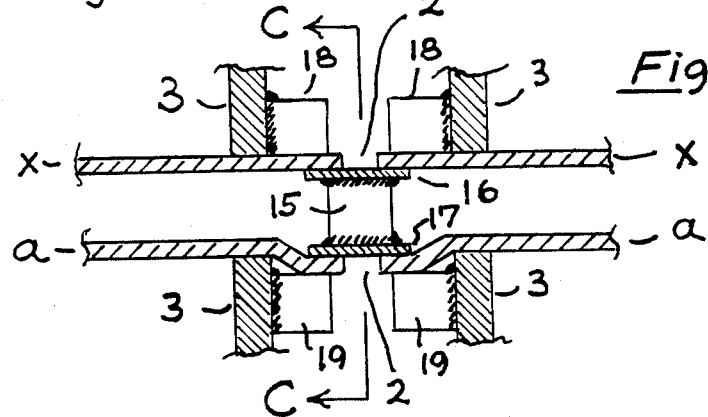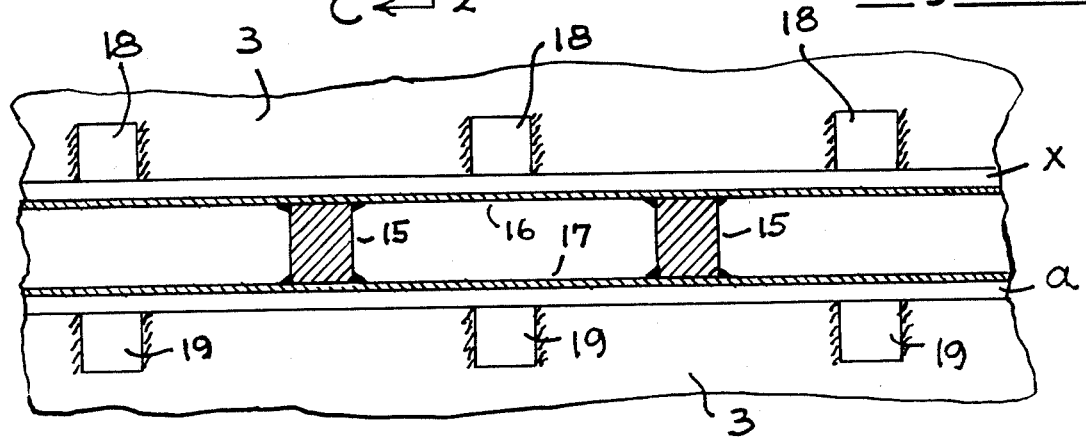

CONTACT TOWER AND METHOD OF ASSEMBLY

This invention relates to novel construction features of mass transfer trays that are chiefly used in liquid-gas or liquid-vapour phase mass transfer. The invention provides new trays which are more universally applicable to large diameter towers.

In the conventional bubble cap, sieve and valve trays the gas- or vapour-liquid contact (henceforth only spoken of as vapour-liquid contact) is achieved by bubbling the vapour through a layer of liquid that may have a depth of several inches. These deep liquid layers are created and maintained on top of the trays, are wholly structure-related, and are therefore independent of the vapour flow. As distinct from those arrangements the type of mass transfer trays with which the invention is concerned are of such a construction and operate in such a way that there is film flow instead, and no important liquid depth at all. Moreover a significant portion of the kinetic energy of the vapour is used to create the liquid film, and move it over the expanse of the tray. In so doing the vapour is brought into effective contact with this film, and effective mass transfer is thereby achieved between the vapour and liquid, without the vapour having to penetrate a deep liquid layer.

The mechanism promoted by such trays is presented in more detail in an initial publication of the inventor in the Trans, Inst. Chem. Engineers, Vol. 40, No. 2, pages 104-113, 1962.

Such trays are assembled in stacks, as has been shown for example in my earlier U.S. Pat. No. 3,367,638 and from which it will be noted that the trays referred to are constructed of only one composite sheet. In view of the fact that the widths of metal sheeting normally available from the manufacturers is usually three to four feet of width, and because the normal manufacturing tools required for trays cannot accommodate pieces that are much larger than five to six feet, it follows that the trays disclosed in U.S. Pat. No. 3,367,638 could only be used for relatively small diameter towers.

In order to meet this limitation, construction details have been proposed whereby the trays are comprised of a multitude of individual sheet widths bolted together and assembled into tray stacks. Such a construction is disclosed in my Patent Specification G.B. No. 1 524 863 (=U.S. Pat. No. 3,928,513).

Whereas trays constructed in accord with my G.B. No. 1 524 863 may be made for any tower diameter regardless how large, it nevertheless requires the tray stacks, wholly assembled first, to be lowered from the top into the vertical column shell.

For the relatively few applications that require no periodic tray inspection, the top of the tower may thereafter be permanently welded to the upper shell. However, for most large diameter towers periodic inspections are required, which means that these large diameter towers must be provided with high grade top flanges which are always very expensive.

Having recognized this dilemma, I have wholly unexpectedly and surprisingly found ways to construct the trays sectionally, as sub-assemblies, so that they may be introduced into the large diameter towers through normal size man ways, thus eliminating the prohibitive cost of top flanges.

Thus, according to one aspect of the invention a gas-liquid contact tower comprises an outer tower shell, a stack of superimposed, substantially flat, horizontal trays spaced vertically apart within the shell so that in use each can carry a thin film of liquid discharged within the tower shell, the horizontal trays being provided with a plurality of flow apertures distributed substantially uniformly over at least part of the surface of the trays, and the apertures being suitable to permit in use the thin liquid film on the trays to flow downwardly therethrough from tray to tray and to permit gas to flow upwardly therethrough from tray to tray, in which the trays are arranged as a plurality of pre-assembled sub-assemblies, each sub-assembly comprising a plurality of tray portions assembled, prior to introduction into the tower shell, to form a sub-stack of vertically spaced apart, substantially superimposed tray portions, at least some of the sub-assemblies being arranged in a side-by-side relationship in the stack.

Thus, sub-stacks of substantially superimposed tray portions are pre-assembled prior to introduction into the tower shell through a suitable man way.

The tray portions, and thus the plan shape of the sub-assemblies, are conveniently shaped to utilize the full width of available metal sheeting, so that usually the junctions between the side-by-side sub-assemblies will be parallel lines extending across the tower cross-section. However, it should be appreciated that the sub-assemblies could be of other plan shapes if desired.

Various constructions of mass transfer tray assemblies in accordance with the invention will now be described, by way of example only, with reference to the accompanying drawings in which:

FIGS. 3 to 11 are schematic vertical cross-sectional views of various arrangements for sealing adjacent tray stack sub-assemblies; and FIG. 12 is a section on the line C—C of FIG. 11.

Figure 1:
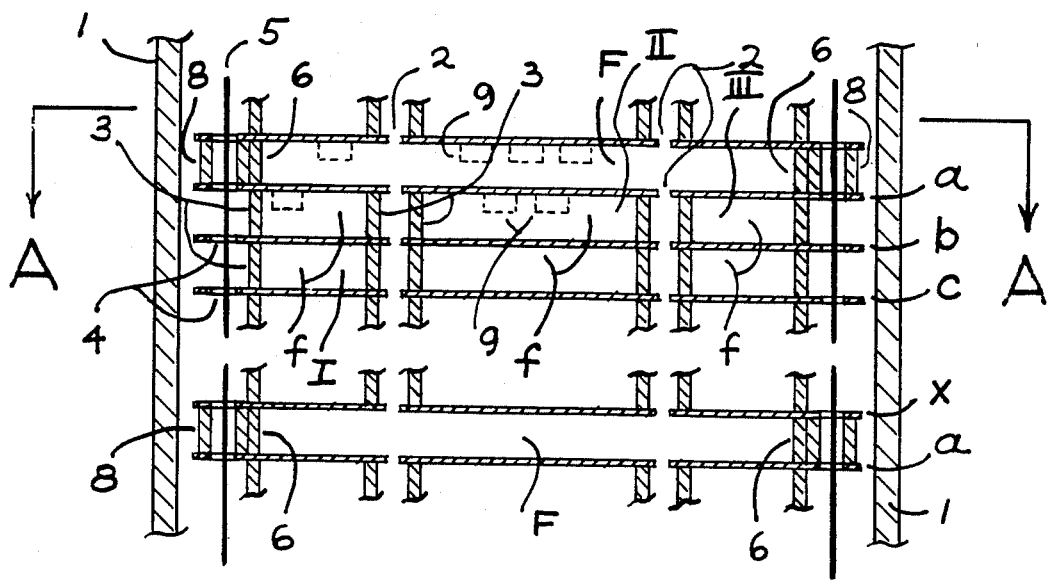
FIG. 1 is a vertical cross-sectional partial view of a tower and tray stack taken on the line B—B of FIG. 2, the tray stack comprising a group of three tray stack sub-assemblies arranged alongside one another.
Figure 2:
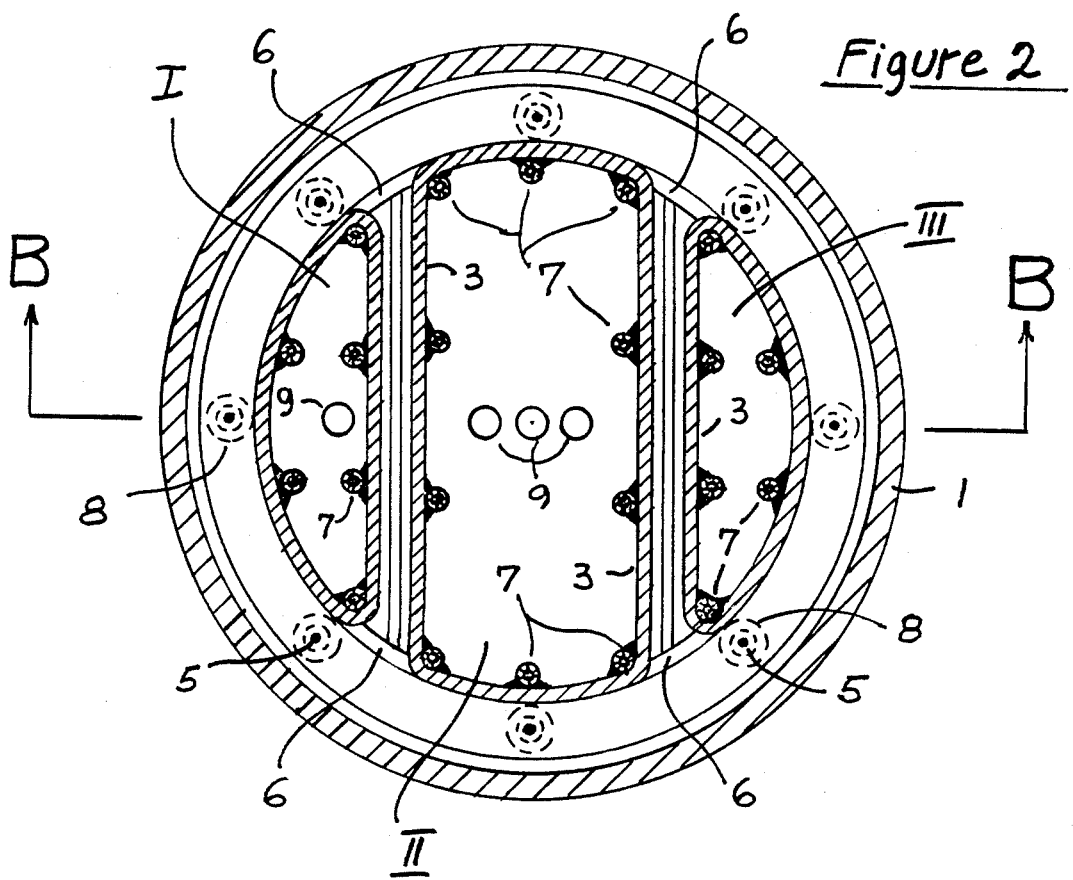
FIG. 2 is a horizontal cross-sectional view on the line A—A of FIG. 1.

FIGS. 1 and 2 show a typical tray stack in accordance with the invention, with the column shell denoted by numeral 1. A typical stack of x trays, spaced apart from each other, as has been disclosed in U.S. Pat. No. 3,367,638 and U.S. Pat. No. 3,928,513, is shown in FIG. 1, with an additional tray (x) at the top and an additional tray (a) at the bottom of the elevational sketch from vertically adjacent stacks of trays in the tower.

It is seen that the tray stack comprises a group of three separate sections or sub-assemblies I, II and III, which are arranged in side-by-side relationship separated from each other by gaps 2.

As shown in FIG. 2, the sub-assemblies I and III are of segmental shape in plan, whereas sub-assembly II has in plan two opposed straight sides and two opposed curved sides. However, it will be appreciated that, depending upon the transverse dimensions of the column shell 1 there will be more than three sub-assemblies in many cases. It would be possible to have only two sub-assemblies in some instances, but this would involve the use of a large man way.

The width of each tray stack sub-assembly is arbitrary except however, that in assembled form it must be narrow enough to pass through a specified man way, with which the tower is to be equipped. Adjacent pairs of trays (a) to (x) in each stack sub-assembly are separated from each other by respective sectional spacer bands 3, which are firmly held together by upper and lower tie rods and tie rod bolting means, neither being shown in the elevational FIG. 1.

As shown in FIG. 2, the bands 3 of the sub-assemblies I and III are formed into a segmental shape of transverse dimensions less than the overall dimensions of the tray segments such that the bands 3 can effect a seal with the tray segments around the entire length of the band. Similarly the bands 3 of sub-assembly II have two straight sides alternating with two curved sides to correspond to the shape of the plates of sub-assembly II, but again the band 3 is spaced inwardly from the peripheries of the superimposed tray portions.

Each sub-assembly is held together, prior to insertion into the tower, by a series of tie rods, hereinafter termed "sub-assembly tie rods", passing vertically through all of the tray portions of the sub-assembly. Nuts are threadedly engaged with opposite ends of the sub-assembly tie rods and abut respectively with the upper and lower tray portions of the sub-assembly to clamp the tray portions and spacer bands 3 together.

Each sub-assembly I, II and III is provided with peripheral openings 4, in each tray, which permits the pre-assembled sub-assembly to be slipped down peripheral guide rods 5, indicated by a line in FIG. 1, and thus permitting the sub-assembly to rest on a peripheral circular spacer band 6. Thus all tray stack sub-assemblies are thereby aligned and are held tightly together by top and bottom screw means on the peripheral tie rods 5, which screw means are not shown in FIG. 1.

It will be noted that in FIG. 2 the peripheral spacer band 6 is visible only between tray sections, because it is covered otherwise by the peripheral portion of the sectional spacer bands 3, the radius of the bands 6 being chosen equal to the radius of the curved portions of the bands 3.

Numeral 17 denotes tubular spacers which are of a height equal to the vertical width of the sectional spacer bands, and which have been welded or otherwise secured to the inside surface of the sectional spacer bands 3, and permit passage of the sub-assembly tie rods, not shown in FIGS. 1 and 2, that hold the sub-assemblies in their pre-assembled condition. By welding the tubular spacers 17 to the sectional spacer bands 3 as shown, greatly improved rigidity is imparted to each sub-assembly. Since all sub-assemblies are held together by threaded nuts provided on both ends of the sub-assembly tie rods (not shown in FIGS. 1 and 2), the welded-on tubular spacers 7 will maintain the sectional spacer bands 3 normal to the planes of the tray portions, which is essential for good contact between spacer bands and tray portions.

If desired, further spacer elements in addition to bands 6 may be provided between the vertically spaced groups of sub-assemblies. Conveniently such further spacer elements may take the form of tubular members which co-operate with the free ends of the sub-assembly tie rod ends of vertically adjacent sub-assemblies, the tubular members abutting with the nuts from which the tie rod ends are arranged to project. Such tubular members would assist also in locating a newly inserted sub-assembly as the stack is built up within the tower.

Tubular spacers 8 are welded or otherwise secured on the outside of peripheral spacer bands 6 to impart added rigidity to the vertical arrangement of groups of sub-assemblies, by tightening with screw means, not shown in FIGS. 1 and 2, to be provided on the top and bottom of tie rods 5.

It will be appreciated that bands 6 cannot be inserted into the tower through a man way in an assembled condition, and accordingly the bands 6 are built up from a plurality of arcuate band portions, the ends of which are welded one to another after the band portions have been located in position in the tower.

FIG. 1 shows that for each sub-assembly, sectional spacer bands 3 define with each pair of vertically adjacent trays three entirely enclosed chambers (f), facilitating flows of liquid and vapour through chimney openings 9 in the trays shown in FIG. 2 and indicated in FIG. 1. The physical dimensions of openings 9 are generally in accordance with disclosures made in my Patent Specification U.S. Pat. No. 3,367,638 and G.B. No. 1 524 863. However, for all three sub-assemblies I, II, III, the chimney openings of the upper and lower trays (a), (x) respectively lead into a common, manifold flow chamber (F). Moreover it will be seen that with the construction shown in FIG. 1, the liquid emanating from lower tray (x) through openings 9 will to some extent enter gaps 2 and pass downwardly between the flow chambers (f) created by the assembly unless further precautions to be described are taken.

Thus a portion of the liquid tends to by-pass the well-defined flow chambers (f), which are instrumental to bring about the most efficient mass transfer between the phases. Hence, in order to assure maximum contacting efficiency, the gaps 2 between the sections must be minimized, if not wholly eliminated. Whereas this may be achieved by a great number of ways, certain methods are preferable from the engineering and operation point of view, and will now be discussed in some detail.

Reference to FIG. 3 shows perhaps the simplest method of creating a seal between horizontally adjacent tray sub-assemblies, with tray (a) of adjoining sub-assemblies being merely overlapped by a small distance. Whereas this method may suffice for many operations where the liquid flow rates are very low, substantial liquid leakage may occur at higher liquid rates, and also because the "fit" of the tray ends may not be achieved satisfactorily, purely due to mechanical reasons.

A better way is indicated in FIG. 4, where the tray ends of adjacent portions of tray (a) have been joggled.

Another way of sealing the gaps in a more positive manner is shown in FIG. 5. The ends of adjoining tray portions have been bent upwards to form together a "V-shaped" formation, capable of receiving gasketing material 10, laid down into the throat of the "V" as far as possible. For added rigidity, the upwardly-extending legs of the "V" may be easily bent over, as is indicated by the dotted lines. Whereas this method has a number of advantages, it is not always desirable to introduce foreign gasketing material.

Another method of closing the gap is shown in FIG. 6 in which the margins of the adjacent portions of trays (a) have been bent 90 degrees upwards, and positioned in close proximity to be capped by longitudinally extending trough 11. In order to secure the trough 11 to the upwardly extending legs of ends of trays (a) lateral compression may readily be applied, as indicated by the two arrows in that Figure. This construction has the obvious advantage of no gasketing material.

Improvements on the arrangement of FIG. 6 are shown in FIGS. 7, 8 and 9, where the separate trough 11 has been eliminated, by providing one leg of the margin of one tray portion with an integral loop 12. Providing additional bends in one leg of the closures as shown in FIGS. 8 and 9 will tend to add rigidity to the rim provided at the end of the tray portion.

FIG. 10 shows a further method which has certain advantages over those already discussed. Both ends of tray (a) have been bent angularly upwards, with both exhibiting a small horizontal shoulder 13. For all practical purposes, both ends may be bent to the same extent. However, the section of tray at the left must be installed first, to be followed by installation of the right-hand section. With both ends having been deformed eventually to the same extent, a fastening down of the right-hand section, after the left-hand section is in place, will apply spring pressure downwardly in the direction of the arrow (p) and will for all practical purposes seal the joint to gas flow. As far as the possibility of liquid seepage down the joint is concerned, this should be impossible because the liquid head on top of the plates is much less than the elevation of the joint denoted by numeral 14 and because the system pressure between sections is slightly in excess of the pressure in flow chambers (F).

My most preferable arrangement for closing gap 2 is apparent from FIGS. 11 and 12. A first measure involves joggling the adjoining edges of tray portions (a) which define gap 2, as shown in FIG. 11, by an amount corresponding to the thickness of an elongate plate 20 which closes gap 2 so as to assure the substantially uninterrupted horizontal progression of tray (a). Plate 20 is connected to a parallel elongate plate 16 by spaced apart lengths of steel rod 15 each welded at opposite ends to the plates 16, 20.

The spacer bands 3 associated with the respective adjacent trays (a) and (x) are in the same positions as in the construction of FIG. 1, but the margins of the adjacent portions of the trays (a) and (x) are rigidified by the provision of respective series of abutment elements 19 and 18 welded to the bands 3 associated with trays (a) and (x) respectively. As is shown in FIG. 12, the abutment elements 18 and 19 are in the form of spaced apart plates. The spacing of the steel rods 15 supporting compression plates 16 and 20 permits vapour and liquids emanating from flow chambers (f) to mix in the single flow chamber (F). This mixing process is essential and important to facilitate the homogenisation of vapours and liquids over the column cross-section. In order to hold compression plates 16 and 20 in position they may be welded to peripheral spacer rings 6 after the pre-assembled unit (15, 16, 20) has been located in position in the tower.

The apparatus is assembled by bolting tie rods 5 so as to extend vertically upwardly from a base, placing spacer band 6 on a support, guiding arcuate segments I, II and III and their bands 3 downwardly by extending spacers 17 through the appropriate rods 5 to lay the segments in side-by-side relationship so as to form segments of a circle, similarly laying on top of the spacer bands 3 an additional layer of arcuate segments, and repeating the process until the desired number of layers are stacked, as shown in FIG. 1.

While I have illustrated and described several embodiments of my invention, it will be understood that these are by way of illustration only and that various changes and modifications are contemplated in my invention within the scope of the following claims.

I claim:

1. The method of assembling a gas-liquid contact tower shell, a stack of superimposed, substantially flat, horizontal trays spaced vertically apart within the shell so that in use each can carry a thin film of liquid discharged within the tower shell, the horizontal trays being provided with a plurality of flow apertures distributed substantially uniformly over at least part of the surface of the trays, and the apertures being suitable to permit in use the thin liquid film on the trays to flow downwardly therethrough from tray to tray and to permit gas to flow upwardly therethrough from tray to tray; the method comprising forming a plurality of separate, preassembled, segmental tray sub-assemblies by separately enclosing segmental portions of each tray with surrounding sectional spacer bands so shaped that a plurality of said sectional spacer bands in side-by-side relationship will form a circle defining the outer periphery of each tray.

2. A method of assembling a stack of trays into a gas-liquid contact tower as claimed in claim 1 comprising pre-assembling said sub-assemblies prior to inserting said sub-assemblies into the tower shell, inserting at least said side-by-side sub-assemblies through a manhole of substantially smaller opening than that of said shell.

3. A method as claimed in claim 1 in which the spacer bands are vertically guided by location means through which extend vertical tie rods.

4. A method as claimed in claim 1 which the sub-assemblies are arranged in vertically spaced groups of side-by-side sub-assemblies.

5. A method as claimed in claim 4 in which a manifold chamber is defined vertically between each such group of sub-assemblies, the flow apertures in the upper plate portions of a group of sub-assemblies all communicating with the respective manifold chamber positioned immediately above said group, and the flow apertures in the lower plate portions of said group all communicating with the respective manifold chamber positioned immediately below said group.

6. A method as claimed in claim 5 in which the manifold chamber is defined in part by a peripheral spacer band which is sandwiched between the lower plate portions of one group of side-by-side sub-assemblies and the upper plate portions of the next lowest group of side-by-side sub-assemblies, the peripheral spacer band extending around said groups adjacent to the periphery of said groups.

7. A method as claimed in claim 6 in which the peripheral spacer band carries location means through which vertical tie rods extend to locate the peripheral spacer band.

8. A method as claimed in claim 7 in which the margins of at least some of the plate portions are provided with apparatus through which extend said tie rods associated with the peripheral spacer band.

9. A method as claimed in claim 4 including sealing by sealing means horizontally-adjacent sub-assemblies to each other to inhibit gas/liquid flow in the vertical direction between the adjacent sub-assemblies.

10. A method as claimed in claim 9 in which the sealing means is arranged to seal between the upper and/or lower plate portions of said adjacent sub-assemblies.

11. A method as claimed in claim 10 in which the sealing means acts between said upper plate portions.

12. A method as claimed in claim 10 in which the sealing means are formed by overlapping margins of corresponding plate portions of adjacent sub-assemblies.

13. A method as claimed in claim 10 in which the overlapping margins are raised above the main parts of the associated plate portions so as to be above the liquid film on said plate portions in use.

14. A method as claimed in claim 12 in which one of said margins is formed as a loop which extends over the other margin which is directed substantially vertically upwards.

15. A method as claimed in claim 9 in which the adjacent margins of corresponding plate portions are directed upwardly and in face-contact with one another, and the sealing means formed by a channel-section member fitted over the contacting margins and arranged to hold them together.

16. A method as claimed in claim 9 in which the adjacent margins of corresponding plate portions, are shaped so as to define between them a recess in which is provided a gasket material constituting said sealing means.

17. A method as claimed in claim 9 in which the sealing means comprises a first elongate member which bridges the gap between adjacent margins of corresponding plate portions and is held in place by a support means which is supported on an adjacent group of sub-assemblies.

18. A method as claimed in claim 17 in which the sealing means further comprises a second elongate member which bridges the gap between adjacent margins of corresponding plate portions of said adjacent group of sub-assemblies, the support means being extended between said first and second elongate members to hold them vertically spaced apart.

19. A method as claimed in claim 18 in which the margins of the plate portions of the group of sub-assemblies engaged by the lower of said first and second elongate members are joggled downwardly to define a recess in which rests said lower elongate member.

20. A gas-liquid contact tower of the kind comprising an outer tower shell, a stack of superimposed, substantially flat, horizontal trays spaced vertically apart within the shell so that in use each can carry a thin film of liquid discharged within the tower shell, the horizontal trays being provided with a plurality of flow apertures distributed substantially uniformly over at least part of the surface of the trays, and the apertures being suitable to permit in use the thin liquid film on the trays to flow downwardly therethrough from tray to tray and to permit gas to flow upwardly therethrough from tray to tray; the improvement comprising a plurality of vertically stacked, segmental, tray sub-assemblies, each segmental, tray sub-assembly comprising a plurality of sectional spacer bands shaped so that when side-by-side, they form a circle, and a plurality of vertical guiding means integrally secured to said sectional spacer bands.

* * * * *